US007660707B2

(12) United States Patent
Maruyama et al.

(10) Patent No.: US 7,660,707 B2
(45) Date of Patent: Feb. 9, 2010

(54) DYNAMIC MODEL DETECTING APPARATUS

(75) Inventors: Yuko Maruyama, Tokyo (JP); Kenji Yamanishi, Tokyo (JP)

(73) Assignee: NEC Corporation, Tokyo (JP)

( * ) Notice: Subject to any disclaimer, the term of this patent is extended or adjusted under 35 U.S.C. 154(b) by 434 days.

(21) Appl. No.: 10/976,787

(22) Filed: Nov. 1, 2004

(65) Prior Publication Data

US 2005/0102122 A1 May 12, 2005

(30) Foreign Application Priority Data

Nov. 10, 2003 (JP) ............................. 2003-379273

(51) Int. Cl.
G06F 17/00 (2006.01)
(52) U.S. Cl. .................. 703/2; 703/6; 703/13; 703/21; 726/22; 726/23; 726/26; 713/188
(58) Field of Classification Search .................. 703/2, 703/6, 13, 21; 706/7, 19, 21; 726/22, 23, 726/24, 26; 713/188
See application file for complete search history.

(56) References Cited

U.S. PATENT DOCUMENTS

| 5,381,513 | A * | 1/1995 | Tsuboka ..................... 704/232 |
| 5,839,105 | A * | 11/1998 | Ostendorf et al. ........... 704/256 |
| 6,366,885 | B1 * | 4/2002 | Basu et al. .................. 704/270 |
| 6,499,012 | B1 * | 12/2002 | Peters et al. ............. 704/256.4 |
| 6,725,208 | B1 * | 4/2004 | Hartman et al. ............... 706/23 |
| 6,742,124 | B1 * | 5/2004 | Kilpatrick et al. ............. 726/23 |
| 6,963,983 | B2 * | 11/2005 | Munson et al. ................ 726/5 |
| 6,993,452 | B2 * | 1/2006 | Huang et al. ................ 702/179 |
| 7,016,825 | B1 * | 3/2006 | Tryon, III ....................... 703/6 |
| 7,082,379 | B1 * | 7/2006 | Bickford et al. .............. 702/178 |
| 7,158,917 | B1 * | 1/2007 | Bickford ....................... 702/181 |
| 7,162,741 | B2 * | 1/2007 | Eskin et al. .................... 726/25 |
| 7,181,768 | B1 * | 2/2007 | Ghosh et al. ................... 726/23 |
| 7,219,056 | B2 * | 5/2007 | Axelrod et al. .............. 704/235 |
| 7,225,343 | B1 * | 5/2007 | Honig et al. ................. 713/194 |
| 7,293,290 | B2 * | 11/2007 | Szor ............................. 726/24 |
| 7,424,619 | B1 * | 9/2008 | Fan et al. ..................... 713/188 |
| 7,426,301 | B2 * | 9/2008 | Porikli ........................ 382/181 |

(Continued)

OTHER PUBLICATIONS

F. Lefevre, "Non-parametric probability estimation for HMM-based automatic speech recognition" Science Direct 2003.*

(Continued)

*Primary Examiner*—Kamini S Shah
*Assistant Examiner*—Kibrom Gebresilassie
(74) *Attorney, Agent, or Firm*—Whitham Curtis Christofferson & Cook, PC

(57) ABSTRACT

A model detection apparatus comprises a number of estimate parameter memories for storing mutually different distribution estimate parameters representing occurrences of input data. A number of distribution estimators are respectively associated with the parameter memories for producing distribution estimate parameters from data stored in the associated parameter memories and from a series of input data, and updating the associated parameter memories with the produced parameters. A model series memory stores candidate models corresponding in number to the parameter memories. A model series estimator produces candidate models using the series of input data, the stored distribution estimate parameters and the stored candidate models, and updates the model series memory with the produced candidate models. An optimal model series calculator calculates an optimal series of models from the candidate models stored in the model series memory.

14 Claims, 5 Drawing Sheets

U.S. PATENT DOCUMENTS

| | | | |
|---|---|---|---|
| 7,448,084 B1 * | 11/2008 | Apap et al. | 726/24 |
| 7,475,405 B2 * | 1/2009 | Manganaris et al. | 719/318 |
| 7,487,542 B2 * | 2/2009 | Boulanger et al. | 726/23 |
| 7,487,544 B2 * | 2/2009 | Schultz et al. | 726/24 |
| 2002/0040367 A1 * | 4/2002 | Choi et al. | 707/104.1 |
| 2002/0138755 A1 * | 9/2002 | Ko | 713/201 |
| 2003/0055640 A1 * | 3/2003 | Burshtein et al. | 704/235 |
| 2003/0101260 A1 * | 5/2003 | Dacier et al. | 709/224 |
| 2003/0194132 A1 * | 10/2003 | Kiyuna | 382/190 |
| 2004/0002930 A1 * | 1/2004 | Oliver et al. | 706/46 |
| 2004/0064735 A1 * | 4/2004 | Frazier et al. | 713/201 |
| 2004/0143756 A1 * | 7/2004 | Munson et al. | 713/200 |
| 2004/0167893 A1 * | 8/2004 | Matsunaga et al. | 707/6 |
| 2004/0205474 A1 * | 10/2004 | Eskin et al. | 715/500 |
| 2005/0071432 A1 * | 3/2005 | Royston | 709/206 |
| 2005/0096866 A1 * | 5/2005 | Shan et al. | 702/179 |
| 2005/0169114 A1 * | 8/2005 | Ahn | 369/7 |
| 2006/0010093 A1 * | 1/2006 | Fan et al. | 707/1 |
| 2006/0178887 A1 * | 8/2006 | Webber | 704/256 |
| 2007/0028219 A1 * | 2/2007 | Miller et al. | 717/124 |
| 2007/0239999 A1 * | 10/2007 | Honig et al. | 713/194 |
| 2007/0260435 A1 * | 11/2007 | Matsunaga et al. | 703/2 |
| 2008/0208526 A1 * | 8/2008 | Thibaux et al. | 702/176 |

OTHER PUBLICATIONS

X. Zhang, P. Fan, and Z. Zhu, "A New Anomaly Detection Method Based on Hierarchical HMM", Aug. 27-29, 2003, IEEE 2003, pp. 249-252.*

S. B. Cho, and S. J. Han, "Two Sophisticated Techniques to Improve HMM-Based Intrusion Detection Systems", pp. 207-219, Sep. 8-10, 2003.*

H. Akaike, "Information Theory and an Extension of the Maximum Likelihood Principle", Breakthrough in Statistics vol. 1 Foundations and Basic Theory, pp. 199-213 (1992.

J. Rissanen, "Modeling by Shortest Data Description", Automatica, vol. 14, pp. 465-471 (1978).

M. Herbster, et al., "Tracting the Best Expert", Marchine Learning, NN, 1-29 (1998).

Kohlmorgen J. et al.;"Identification of nonstationary dynamics in physiological recordings"; Biological Cybernetics; 83; 2000; pp. 73-84.

Smith P.; "Markov monitoring with unknown states"; IEEE Journal on Selected Areas in Communications; vol. 12, No. 9; 1994; pp. 1600-1612.

Theodoridis S. and al.; "Pattern Recognition, HMMS"; Pattern Recognition, San Diego, CA: Academic Press US; Chap. 9; 1999; pp. 316-326.

Vasundhara et al.; "Adaptive Methods for Activity Monitoring of Streaming Data"; Proceedings of the 2002 International Conferences on Machine Learning and Applications (ICMLA 02), Las Vegas, Nevada; Jun. 24, 2002; pp. 197-203.

Shonlau M. et al.;"Computer Intrusion: Detecting Masquerades"; Statistical Science; vol. 16 No. 1; Feb. 2001; pp. 58-7.

Maruyama Y. et al.; "Dynamic Model Selection with Its Applications to Computer Security"; Information Theory Workshop, 2004. IEEE, Oct. 24, 2004; pp. 82-87.

Nov. 3, 2006 European Search Report, pp. 1 to 4.

Y. Matsunaga, et al., "An Information-theoretic Approach to Detecting Anomalous Behaviors", Information Technology Letters, vol. 2, pp. 123-124 (2003).

* cited by examiner

DYNAMIC MODEL DETECTING APPARATUS

BACKGROUND OF THE INVENTION

1. Field of the Invention

The present invention relates to apparatus for statistical model detection and more specifically to an apparatus for dynamically detecting a model from a series of input data.

2. Description of the Related Art

A number of dynamic model fitting methods have been proposed in the fields of statistics and data mining, a technique for the automated detection of hidden predictive information from databases to solve business decision problems. A paper titled "Information Theory and an Extension of the Maximum Likelihood Principle", H. Akaike, in the Proceedings of the Second International Symposium on Information Theory, edited by B. N. Petrov and F. Csaki (Budapest: Akademia Kiado), pages 267-281, 1973 and a paper titled "Modeling By Shortest Data Description", J. Rissanen, Automatica, Vol. 14, pages 465-471, 1978, describe a model fitting method for extracting an optimal model based on the regularity of time serial data. However, because of data regularity on which these prior art techniques are based, it is impossible to use the prior art for adaptively fitting a model on data sources that vary significantly with time.

Paper titled "Tracking the Best Expert", M. Herbester and M. K. Warmuth, the Journal of Machine Learning, NN, 1-29 (1998), Kluwer Academic Publishers, Boston, pages 151-178, describes a successive prediction method for irregular time serial data in which the accumulated prediction loss is substantially equal to a value which would be obtained by the use of an optimal model at each successive point. While successive adaptive prediction can be used, the prior art is incapable of extracting an optimal model from the databases.

A Japanese-language technical paper titled "An Information-theoretic Approach to Detecting Anomalous Behaviors", Yuko Matsunaga et al, the Forum of Information Technology (FIT), Information Technology Letters 2003, pages 123-124, describes a method of detecting anomalous behaviors by using dynamic model fitting based on predictive probabilistic complexity.

While this prior art provides adaptive and successive model detection, the level of precision that can be obtained from irregular time serial data is not satisfactory since this prior art extracts only one optimal model from all data that exist in the range from the beginning to the most recent time.

SUMMARY OF THE INVENTION

It is therefore an object of the present invention to provide a model detection apparatus capable of extracting an accurate model by adaptively and successively tracking the variations of a data source.

It is another object of the present invention to provide a model detection apparatus capable of detecting a change at the instant it begins to occur in a series of estimated models.

It is a further object of the present invention to provide a model detection apparatus capable of detecting a pattern representing a structural change at the instant a change begins to occur in a series of estimated models.

According to a first aspect of the present invention, there is provided a model detection apparatus for detecting a model from a series of input data, comprising a plurality of estimate parameter memories for respectively storing mutually different distribution estimate parameters representing occurrences of the input data, a plurality of distribution estimators respectively associated with the estimate parameter memories for producing a plurality of distribution estimate parameters from data stored in the associated estimate parameter memories and from the series of input data, and updating the associated estimate parameter memories with the produced distribution estimate parameters, a model series memory for storing a plurality of candidate models corresponding in number to the estimate parameter memories, a model series estimator for producing a plurality of candidate models from the series of input data, the distribution estimate parameters stored in the estimate parameter memories and the candidate models stored in the model series memory, and updating the model series memory with the produced candidate models, and an optimal model series calculator for calculating an optimal series of models from the plurality of candidate models stored in the model series memory.

Preferably, a model transition probability estimator is provided for estimating transition probability of each of the candidate models stored in the model series memory and supplying a value indicating the estimated transition probability to the model series estimator.

According to a second aspect of the present invention, there is provided a model detection apparatus for detecting a model from a series of input data, comprising a plurality of estimate parameter memories for respectively storing mutually different distribution estimate parameters representing occurrences of the input data, a plurality of distribution estimators respectively associated with the estimate parameter memories for producing a plurality of distribution estimate parameters from data stored in the associated estimate parameter memories and from the series of input data, and updating the associated estimate parameter memories with the produced distribution estimate parameters, a plurality of confidence calculators respectively associated with the estimate parameter memories for calculating confidence values of data stored in the associated estimate parameter memories, a plurality of confidence memories for respectively storing the calculated confidence values, a transition probability memory for storing a plurality of transition probability data, a model transition probability estimator for estimating transition probability from data stored in the confidence memories and data stored in the transition probability memory and updating the transition probability memory with the estimated transition probability, and an optimal model series calculator for calculating an optimal series of models from data stored in the confidence memories and data stored in the transition probability memory.

BRIEF DESCRIPTION OF THE DRAWINGS

The present invention will be described in detail further with reference to the following drawings, in which.

DETAILED DESCRIPTION

Figure 1:
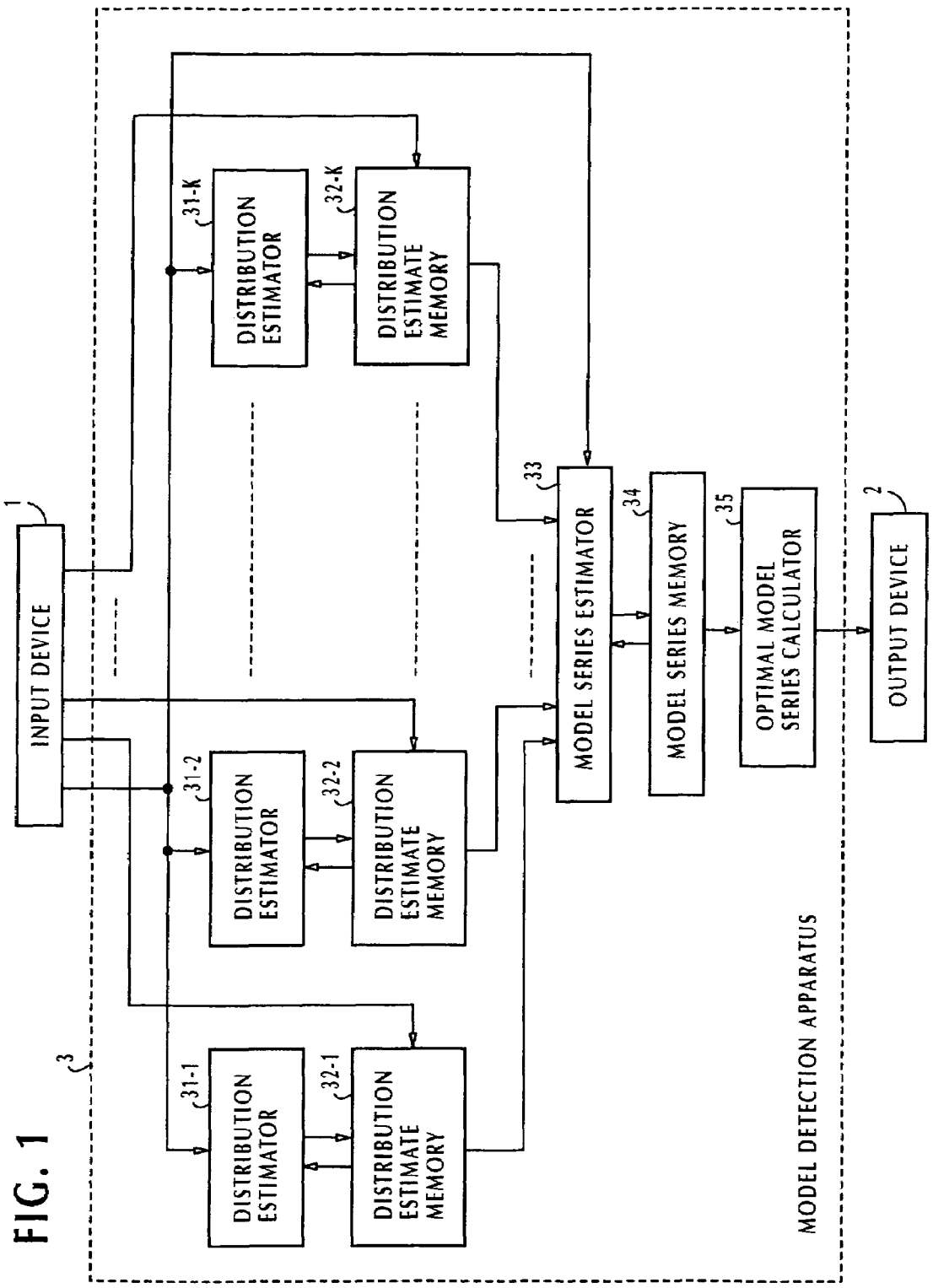
FIG. 1 is a block diagram of a model detection system according to a first embodiment of the present invention.

Referring now to FIG. 1, there is shown a dynamic model detection system according to a first embodiment of the present invention. As illustrated, the dynamic model detection system essentially comprises an input device 1, an output device 2 and a model detection apparatus 3 connected between the input and output devices. Input device 1 is used to enter time serial data and the output device 2 is used to deliver a processing result of the calculator 3.

Model detection apparatus 3 is comprised of a plurality of distribution estimators 31-1 through 31-K and a plurality of distribution estimate memories 32-1 through 32-K connected respectively to the distribution estimators 31. All the distribution estimators 31 are connected to the input device 1 to receive the entered time serial data and update the corresponding memories 32 with distribution estimate parameters in a manner to be described below.

The outputs of all distribution estimate memories 32 are connected to a model series estimator 33 to which the output of input device 1 is also applied. A model series memory 34 is connected to the model series estimator 33 to store its output as a candidate for an optimal model series.

An optimal model series calculator 35 is connected to the model series memory 34 to determine an optimal model series from a plurality of candidate model series stored in the memory 34.

Whenever data "x" is entered to all the distribution estimators 31 and the model series estimator 33 simultaneously, the model series estimator 33 uses the distribution estimate parameters stored in the memories 32 to determine the confidence of data "x", and uses the determined confidence to estimate a most recent candidate model and updates the memory 34 with the estimated candidate model.

The following is a description of the operation of distribution estimators 31 by considering K probability models $k_i$ (where i=1, 2, . . . , K) for the K distribution estimators 31, respectively.

When the system is started, all the distribution estimate memories 32 are initialized with respectively different distribution estimate parameters supplied from the input device 1. Then, a series of data blocks $x^n = x_1, x_2 + \ldots + x_n$ are successively supplied in this order to all the distribution estimators 31 (where the subscript "n" represents the current time instant). For estimating each of the probability models, a known method such as the maximum likelihood estimation method, for example, is used by the distribution estimators 31. Assume that a probability model at time "t" is designated $k_t$ (where $k_t \in \{1, 2 \ldots, K\}$). If a series of probability models $k^{t-1}$ (=$k_1+k_2+\ldots+k_{t-1}$) and a series of data $x^{t-1}$ (=$x_1+x_2+\ldots+x_{t-1}$) are given during a time interval between t=1 and t=t−1, provided that the conditional probability $P_t(k_t=k|k^{t-1}, x^{t-1})$, i.e., "$k_t$" equals "k", is known in advance, the joint probability of occurrences of data series $x^n$ is given by the following equation:

$$P(x^n) = \sum_{k^n} \prod_{t=1}^{n} P_t(k_t|k^{t-1}, x^{t-1}) P(x_t|\hat{\theta}_{k_t}^{(t-1)}) \quad (1)$$

where, the subscript $k^n$ of the symbol $\Sigma$ represents a sum of all combinations of probability models $k^n$ and $\hat{\theta}_{k_t}^{(t-1)}$ represents the distribution estimate parameter stored in each of the distribution estimate memories 32. Each of the distribution estimators 31 calculates the probability of occurrence of data $x^t$ by using the distribution estimate parameter $\hat{\theta}_{k_t}^{(t-1)}$ stored in the corresponding distribution estimate memory 32, and updates the corresponding memory 32 with the result of Equation (1) that represents distribution estimate parameters $\hat{\theta}$.

On the other hand, the logarithm of Equation (1), i.e., $-\log_2 P(x^n)$, represents the length of code $x^n$. By omitting logarithmic base 2 for simplicity, the logarithm of P ($x^n$) is given by the following equation:

$$-\log P(x^n) \le \quad (2)$$
$$\min_{k^n}\left(\sum_{t=1}^{n} -\log P_t(k_t|k^{t-1}, x^{t-1})\right) + \sum_{t=1}^{n} -\log P_t(x_t|\hat{\theta}_{k_t}^{t-1}))$$

Therefore, the following Equation (3) can be defined as a criterion for dynamically detecting a probability model. An optimal probability model series $k_n$ that minimizes Equation (3) is defined as follows:

$$l(x^n : k^n) = \left(\sum_{t=1}^{n} -\log P_t(k_t|k^{t-1}, x^{t-1})\right) + \sum_{t=1}^{n} -\log P_t(x_t|\hat{\theta}_{k_t}^{t-1})) \quad (3)$$

Model series estimator 33 receives the distribution estimate parameters from the distribution estimate memories 32 and the time serial data from the input device 1 and successively calculates an optimal probability model series $k_n$ that minimizes Equation (3) and stores it in the model series memory 34 as a candidate model series. As a result, a plurality of such candidate model series and their calculated values of Equation (3) are stored in the model series memory 34. From the memory 34, the model series estimator 33 retrieves a number of candidate model series that are necessary for determining an optimal candidate model series and their calculated values of Equation (3), and updates them by re-calculating Equation (3) for each of the retrieved model series.

If a relation $P_t(k_t=k|k^{t-1}, x^{t-1})=P(k_t=k|k_{t-1})$ holds, for example, the model series estimator 33 can advantageously use the Viterbi algorithm (described in "Error Bounds for Convolutional Codes and an Asymptotically Optimum Decoding Algorithm", IEEE Transactions on Information Theory, 13, pages 260-267, 1967) to effectively compute the optimal model series $k^n$ with an amount of computations $O(K^2 n)$, while storing K model series into the memory 34 at each instant of time "t". In this case, the model series estimator 33 selects only one optimal series from a set of K combinations in each of which the model $k_t$ is equal to k (where k=1, 2, . . . , K) at each time instant and stores the selected series into the memory 34. In the following Equation (4), the term S(k, t) represents the value of Equation (3) obtained when the relation that $k_t$=k holds at time "t".

$$S(k, t) = \min_{k^t}\{S(k^t, t-1) - \log P(x^t | \hat{\theta}_k^{(t-1)}) - \log P_t(k | k^t)\} \quad (4)$$

More specifically, the model series estimator 33 retrieves a value S(k', t−1) from each of the K model series $k_{t-1}$=k' (where k'=1, 2, . . . , K) stored in the memory 34 and uses it to calculate Equation (4) to obtain an optimal model series $k_t$=k and updates the contents of the memory 34 with the calculated value of S(k, t) of Equation (4).

If P ($k_t$=k|$k_{t-1}$) is given by Equation (5) below, Equation (3) exactly fits the theory of stochastic complexity (described in "Universal Coding, Information, Prediction and Estimation, IEEE Transactions on Information Theory, Vol. 30, pages 629-636, 1984).

$$P(k_1) = \frac{1}{K}, P(k_t|k_{t-1}) = 1, (t \ge 2) \quad (5)$$

In addition, if P ($k_t$=k|$k_{t-1}$) is given by Equation (6) below, the model transitions only to an adjacent model. As will be described later, Equation (6) is useful for examining the whole structure of data.

$$P(k_1) = \frac{1}{K}, \quad P(k_t|k_{t-1}) = \begin{cases} 1-\alpha, & \text{if } k_t = k_{t-1} \text{ and } k_{t-1} \neq 1, K \\ 1-\alpha/2, & \text{if } k_t = k_{t-1} \text{ and } k_{t-1} = 1, K \\ \alpha/2, & \text{if } k_{t-1} = k_{t-1} \pm 1 \end{cases} \quad (6)$$

where, α represents a parameter of constant value representing the probability of model transition.

Optimal model series calculator 35 retrieves K model series and their re-calculated values of S(k, t) from the model series memory 34 and selects a minimum of the retrieved calculated values as an optimal model series.

If the probability of model transition is known in advance, the first embodiment of the present invention detects models with a high degree of precision while keeping track of changes that can occur in the information source.

The following is a description of the operation of the model detection apparatus 3 of FIG. 1 using data collected according to the paper "Computer Intrusion: Detecting Masquerades, Shonlau et al., Statistical Science, Vol. 16(1), pages 58-74, 2001, in which a sequence of user commands of variable length is generated at periodic intervals and supplied through the input device 1 to the model detection apparatus 3. Note that the input command sequence is a discrete random vector and its probability distribution is a mixed Markov model. Each command sequence may assume a different length than other sequences of user commands. The Markov model of each mixed distribution is a set of similar command sequences and represents a behavioral pattern of a number of users. Mixed distributions k (where k =1, 2, . . . , K) are respectively calculated by the distribution estimators 31-1~31-K to produce K distribution estimates and stored in the corresponding memories 32. Model series estimator 33 operates with the model series memory 34 by iteratively estimating an optimal probability model from a series of candidate models stored in the memory 34 and updating the stored candidate models with the estimated optimal probability model. At each instant of time, the optimal model series calculator 35 determines an optimal probability model series from the candidate models stored in the memory 34. If the optimal model series calculator 35 produces a model series 1, 1, 1, 2, 2, . . . , it implies that the number of users' behavioral patterns is increased from one to two. This embodiment is useful for input data whose variation has a determinable periodicity, i.e., the model's transition probability.

Figure 2:
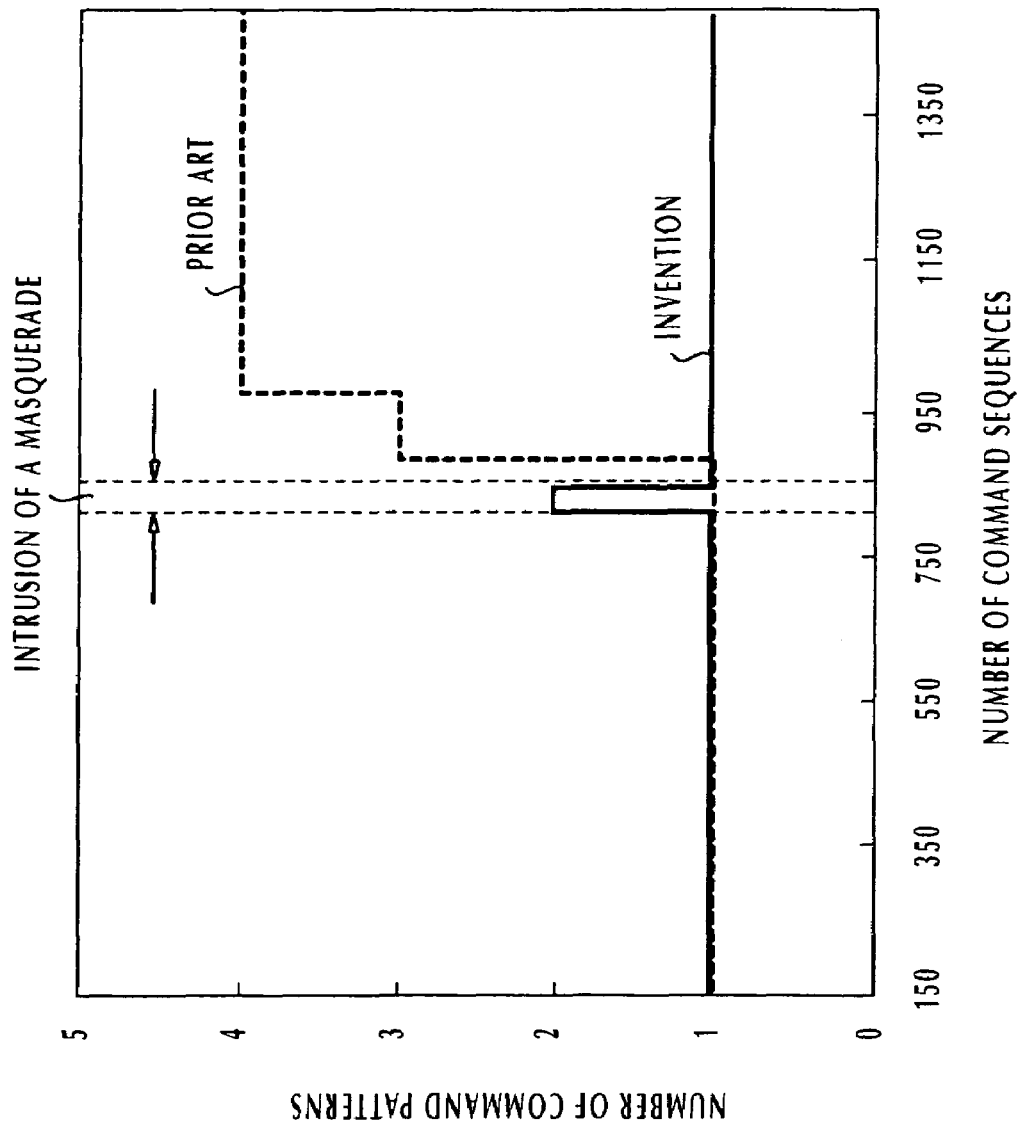
FIG. 2 is a graphic representation of comparisons between the present invention and the prior art.

FIG. 2 is a graphic representation of experimental results for comparison between the present invention and the prior art disclosed in the aforesaid Japanese-language technical paper "An Information-theoretic Approach to Detecting Anomalous Behaviors". As illustrated, the command data is mixed with the command data of an anomalous behavior by a masquerade, which has intruded at the midst of the time scale. The thick solid line, which indicates the present invention, shows a rapid change in the number of command patterns that exactly occurs when the intrusion of the masquerade is just taking place. In comparison, the prior art shows no rapid responses at all when the anomalous behavior is occurring. Rather, the prior art shows delayed responses after the anomalous behavior has occurred.

In a second embodiment of the present invention described below, it is assumed that the conditional probability is unknown.

Figure 3:
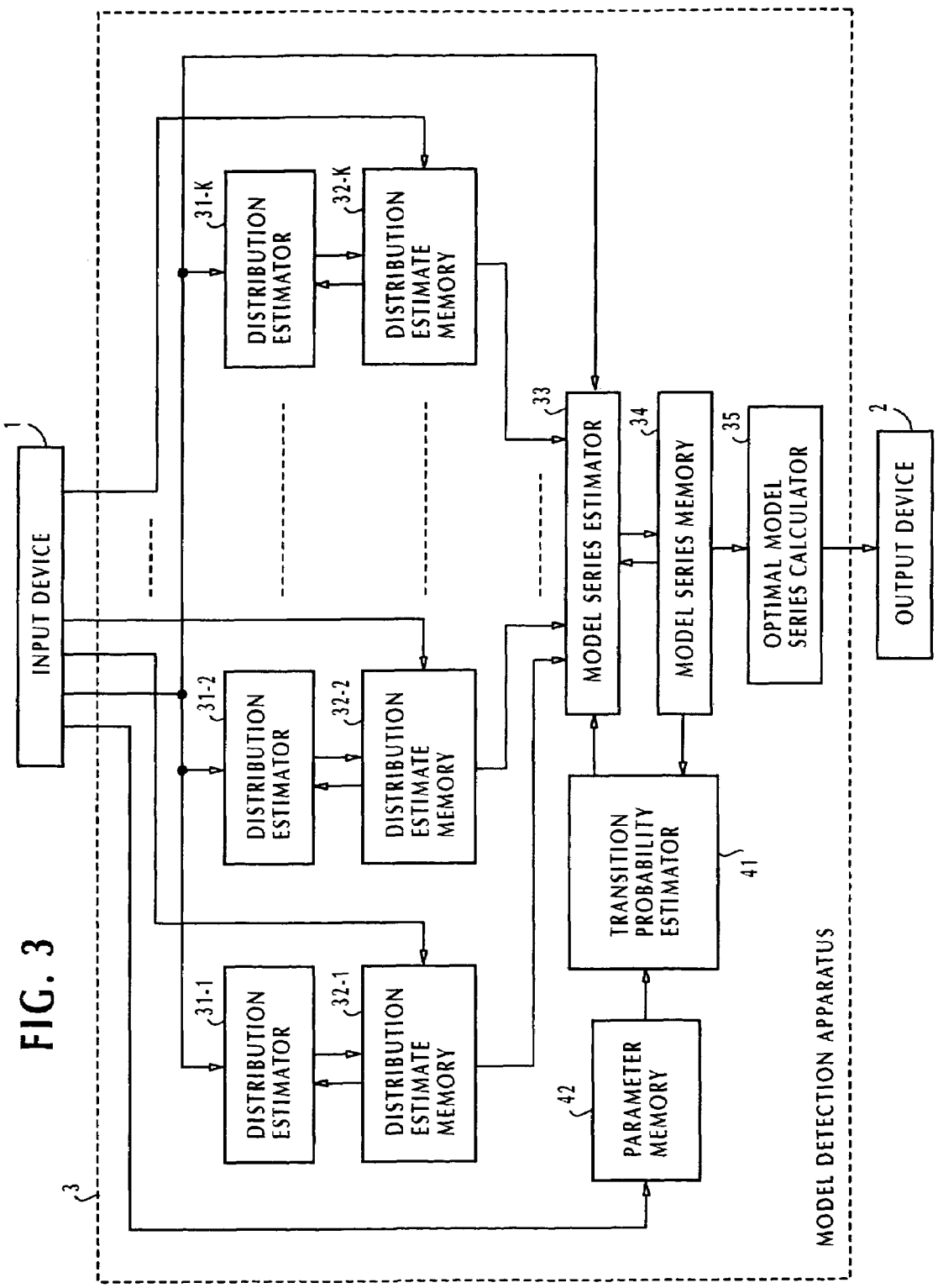
FIG. 3 is a block diagram of a model detection system according to a second embodiment of the present invention.

FIG. 3 is a block diagram of the second embodiment that differs from FIG. 1 by the inclusion of a model transition probability estimator 41 connected in a feedback circuit between the model series memory 34 and the model series estimator 33. A parameter memory 42 is connected to the input device 1 to store a plurality of initial parameters of the conditional probability $P_t$ ($k_t$=k|$k_{t-1}$) before data is supplied from the input device 1. Transition probability estimator 41 reads the initial parameters from the memory 42 to perform calculations on each of the candidate model series stored in the model series memory 34.

Assume that a model series $k^{t-1}$=$k_1$, . . . , $k_{t-1}$ and a series of data $x^{t-1}$=$x_1$, . . . , $x_{t-1}$ are given for a situation in which the conditional probability that $k_t$=k (i.e., $P_t$ ($k_t$=k|$k^{t-1}$, $x^{t-1}$) is unknown. Model transition probability estimator 41 estimates this conditional probability in a manner described below.

If a dynamic model detection criterion is represented by the following Equation (7) based on an estimated probability distribution, a model series $k_n$ that minimizes Equation (7) can be determined as an optimal model series.

$$l(x^n : k^n) = \left(\sum_{t=1}^{n} -\log \hat{P}_t(k_t|k^{t-1}, x^{t-1})\right) + \sum_{t=1}^{n} -\log P_t(x_t|\hat{\theta}_{k_t}^{t-1}) \quad (7)$$

Model series estimator 33 and the associated memory 34 jointly operate by successively re-calculating an optimal model series $k_n$ that minimizes Equation (7) using the plurality of candidate model series stored in the memory 34 and the current data series from the input device 1, and storing a plurality of re-calculated values of Equation (7) corresponding to a plurality of candidate model series in the memory 34 sufficient in number to determine an optimal model series.

More specifically, if the relation $P_t$ ($k_t$=k|$k^{t-1}$, $x^{t-1}$)=$P_t$ ($k_t$=k|$k_{t-1}$) holds, the model transition probability estimator 41 calculates Equations (8) and (9) given below by using distribution estimate parameters stored in the model series memory 34 and supplies its output to the model series estimator 33:

$$P(k|x_t) = \frac{\hat{P}_t(k)P_t(x_t|\hat{\theta}_k^{t-1})}{\sum_k \hat{P}_t(k)P_t(x_t|\hat{\theta}_k^{t-1})} \quad (8)$$

$$\hat{P}_{t+1}(k) = (1-r)\hat{P}_t(k) + r \cdot P_t(k|x_t) \quad (9)$$

where, "r" is the discounting parameter of past data which is in the range between 0 and 1. This parameter represents the speed at which the past data is valued less and less in a weighting process. In this case, the model series estimator 33 receives P(k|$x_t$) and $\hat{P}_{t+1}$(k) from the transition probability estimator 41 and selects, at each instant, a model "k" that minimizes the following Equation (10) and stores it into the memory 34.

$$S(k,t+1) = -\log \hat{P}_{t+1}(k) - \log P(x_{t+1}|\hat{\theta}_k^{(t)}) \quad (10)$$

If the relation $P_t$ ($k_t$=k|$k^{t-1}$, $x^{t-1}$)=$P_t$ ($k_t$=k|$k_{t-1}$) holds and the conditional probability $P_t$ ($k_t$=k|$k^{t-1}$, $x^{t-1}$) of Equation (6) is constant (provided that α is unknown), the transition probability estimator 41 calculates an optimal model series $k_n$ that minimizes Equation (7) with an amount of computations O(Kn) by estimating the conditional probability $P_t$($k_t$=k|$k^{t-1}$, $x^{t-1}$) from the following Equations (11) and (12):

$$\alpha(N_{k,t}) = \frac{N_{k,t} + \frac{1}{2}}{t} \quad (11)$$

where $N_{k,t}$ is the number of times a model has repeatedly undergone transition until it becomes equal to "k" at time "t". Model transition estimator 41 performs its estimating process on the value $\alpha(N_{k,t})$ based on the theory proposed by Krichevsky and Trofimov (The Performance of Universal Encoding, IEEE Transactions on Information Theory, Vol. 27, pages 199-207, 1981).

$$S(k, N_{k,t}, t) = \min_{k^t, N_{k^t,t-1}=1} \{S(k^t, N_{k^t,t-1}, t-1) - \log P(x_t \mid \quad (12)$$
$$\hat{\theta}_k^{(t-1)}) - \log \hat{P}_t(k \mid k^t, \alpha(N_{k^t,t-1}))\}$$

where the third term of Equation (12) is equal to Equation (6) whose value a is substituted for by the value $\alpha(N_{k,t})$ of Equation (11). At each instant of time, the model series estimator 33 makes a comparison on 3(t−1) paths (i.e, including two adjacent models and a model between them) and the model series memory 34 stores only (K×t) model series.

If a sufficiently large amount of data is processed, the upper limit of the result of Equation (7) coincides with the theoretical upper limit of the following Equation (13).

$$\min_{m} \min_{(t_1,\ldots,t_m)} \min_{(k(0),\ldots,k(m))} \left\{ \sum_{j=0}^{m} \sum_{t=t_j}^{t_{j+1}-1} -\log P(x_t \mid \hat{\theta}_{k(j)}^{t-1}) + \quad (13) \right.$$
$$\left. nH\left(\frac{m}{n}\right) + \frac{1}{2}\log n + m + o(\log n) \right\}$$

where "m" represents the number of transitions, $t_1, \ldots, t_m$ indicate the time instants at which model transitions respectively occurred (where $t_k=1$, $t_{m+1}=n+1$), H(x) is the binary entropy function −x log x−(1−x) log (1−x) of model transition probability, and (½)log n+o(log n) is the coding cost necessary for estimating the model transition probability (where o(log n) can be ignored with respect to log n if n approaches infinity). Further, k(j) represents the model at each of time instants $t_j, \ldots, t_{j+1}-1$ (where j=0, ..., m).

If the relation $P_t(k_t=k \mid k^{t-1}, x^{t-1}) = P_t(k_t=k \mid k_{t-1})$ holds and the conditional probability $P_t(k_t=k \mid k^{t-1}, x^{t-1})$ of Equation (6) is variable with time (provided that a is unknown), the model transition probability estimator 41 performs a window-type estimation of the Krichevsky/Trofimov theory. In this case, the model transition probability estimator 41 calculates an optimal model series $k_n$ that minimizes Equation (7) with an amount of computations $O(K^{B-1}n)$ by estimating the conditional probability $P_t(k_t=k \mid k^{t-1}, x^{t-1})$ from the following Equations (14) and (15):

$$\alpha(N_{k_{t-B},\ldots,k_t}) = \frac{N_{k_{t-B},\ldots,k_{t-1}} + \frac{1}{2}}{B} \quad (14)$$

$$S(k_{t-B+1},\ldots,k_t) = \min_{k_{t-B}} \{S(k_{t-B},\ldots,k_{t-1}k^t) - \log P(x_t \mid \hat{\theta}_k^{(t-1)}) - \quad (15)$$
$$\log \hat{P}_t(k_t \mid k_{t-1}, \alpha(N_{k_{t-B},\ldots,k_{t-1}}))\}$$

where, B indicates the window size which is used only when data that occurs from the current instant to the time instant B is estimated. Transition probability estimator 41 uses Equation (14) to estimate the value a by using the number of transitions through which the model has undergone from the instant prior to the time B to the current. The third term of Equation (15) is equal to Equation (6) whose value α is substituted for by the estimated value $\alpha(N_{k,t})$ of Equation (14). At each instant of time, the model series memory 34 stores only KB model series and the model series estimator 33 performs comparisons of 3 KB paths.

Even if the probability of model transition is unknown, the second embodiment of the present invention detects models with a high degree of precision while keeping track of changes that can occur in the information source.

Figure 4:
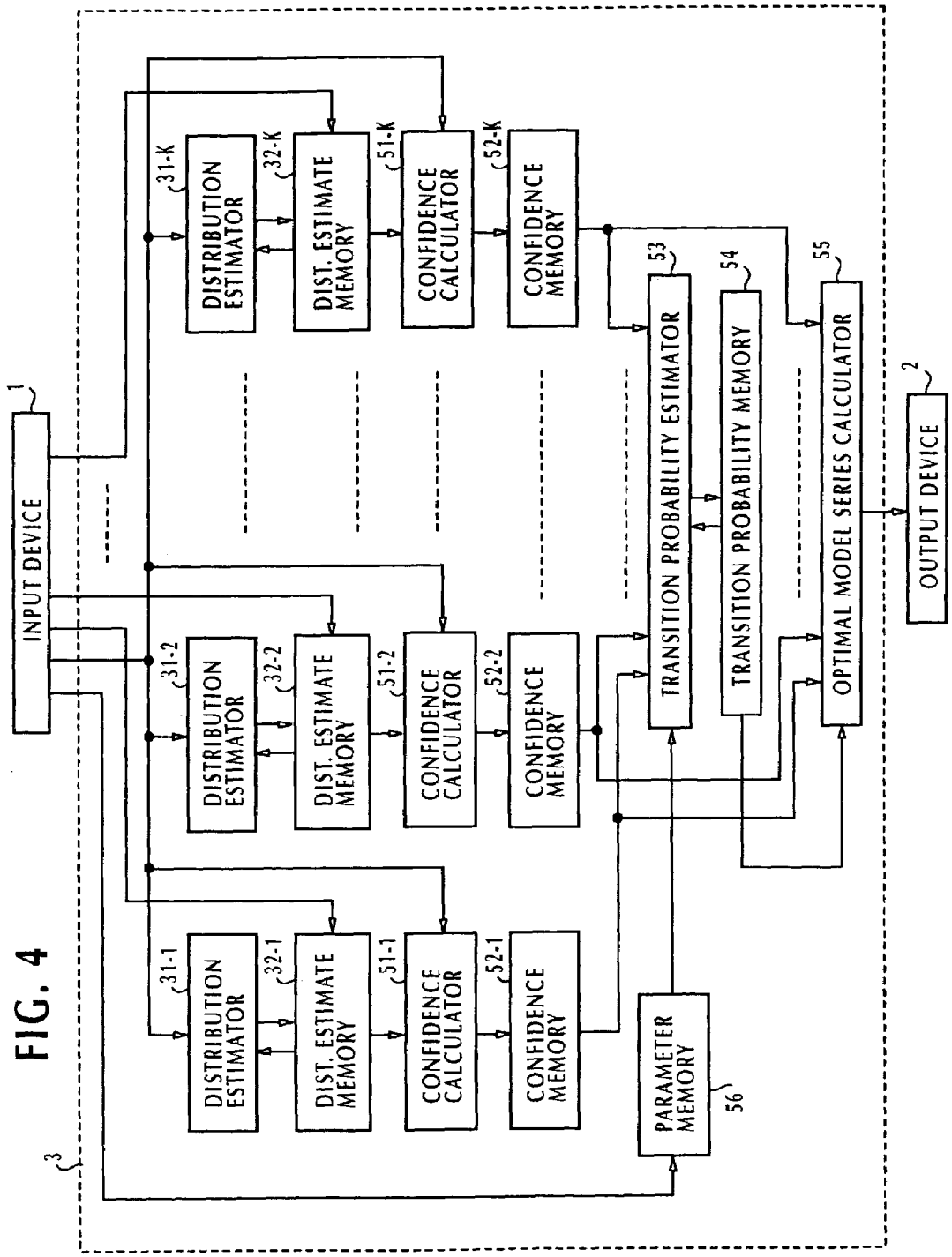
FIG. 4 is a block diagram of a model detection system according to a third embodiment of the present invention.

FIG. 4 illustrates a third embodiment of the present invention. In this embodiment, a plurality of confidence calculators 51-1~51-K are connected to the output of distribution estimate memories 32-1~32-K, respectively. To each of the confidence calculators 51, the input device 1 supplies the same data series as one that is supplied to each of the distribution estimators 31. Using the data from the input device 1, each of the confidence calculators 51-1~51-K determines the level of certainty, or confidence of the distribution estimate stored in the corresponding memory 32 and saves the calculated confidence value in a corresponding one of a plurality of confidence memories 52-1~52-K. The outputs of confidence memories 52 are connected to a model transition probability estimator 53 and further to an optimal model series calculator 55. A parameter memory 56 is connected to the input device 1 to store the initial values of all parameters of the conditional probability $P_t(k_t=k \mid k_{t-1})$ before the input device 1 supplies data to the model detecting calculator 3.

Model transition probability estimator 53 reads the initial parameters from the memory 56 to perform its operation and stores its output in a transition probability memory 54 and successively updates the stored value of transition probability.

For example, if $P_t(k_t=k \mid k^{t-1}, x^{t-1}) = P_t(k_t=k \mid k_{t-1})$ holds and if $P_t(k_t=k \mid k_{t-1})$ is of unknown constant value, the model transition probability estimator 53 estimates the probability of model transition using the Baum-Welch algorithm (as described in "A Maximization Technique Occurring in the Statistical Analysis of Probabilistic Functions of Markov Chains", The Annals of Mathematical Statistics, Vol. 41(1), pages 164-171, 1970) which is often used in the hidden Markov model parameter estimation, as well as the parameters stored in the memory 56. Note that the estimating parameter of $P_t(k_t=k \mid k_{t-1})$ at time "t" can be used as the initial value of the Baum-Welch algorithm at time "t+1".

Furthermore, if $P_t(k_t=k \mid k^{t-1}, x^{t-1}) = P_t(k_t=k \mid k_{t-1})$ holds and if $P_t(k_t=k \mid k_{t-1})$ is of time-variant unknown value, the model transition probability estimator 53 performs a window-type transition probability estimation. Specifically, the estimator 53 estimates the model transition probability based on the Baum-Welch algorithm by using the confidence values stored in the confidence memories 52 from the instant B up to the current instant. Although a longer time will be needed to perform computation than is required in the second embodiment, models detected in this manner are more precise than those of the second embodiment.

Even if the probability of model transition is unknown, the third embodiment of the present invention is able to detect models with a higher degree of precision compared to the second embodiment, while following changes, which can occur in the information source.

Optimal model series calculator 55 uses the transition probability stored in the memory 54 to determine an optimal series of models that minimizes Equation (7) from data stored in the confidence memories 52-1~52-K.

Figure 5:
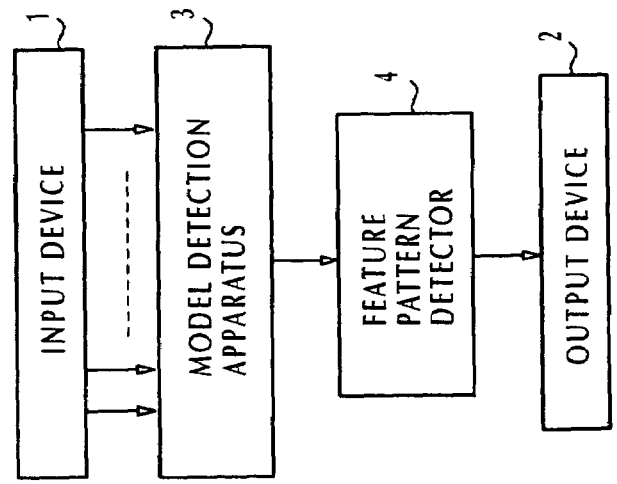

FIG. 5 is a block diagram of a modified embodiment of the present invention in which a feature pattern detector 4 is connected to the output of the model detection apparatus 3 to detect a particular feature pattern in at least one series of models and gives a warning signal through the output device 2 when the intended pattern is detected.

In the previous embodiments, mention has been made of detecting model series. In a given model series delivered from the output device 2, the most recent model is a model detected on a real-time basis. A plurality of models detected on a real-time basis constitute another series of models and the precision of such real-time model series is lower than the precision of the model series detected in the previous embodiments. Although the model series detected by the methods described above meet the precision requirements of many applications, there are applications that impose less severe precision requirements. Therefore, a series of real-time models can be advantageously used in such applications for which the following embodiments are useful.

Figure 6:
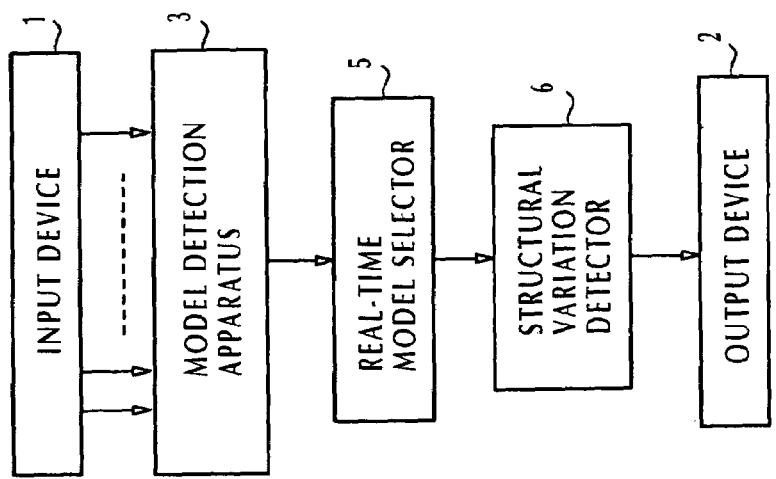

One of such modifications is shown in FIG. 6 in which the output of the model detection apparatus 3 of any of the previous embodiments is supplied to a real-time model selector 5, which selects a most recently detected model from the model series detected by the apparatus 3. A structural variation detector 6 is connected to the output of the real-time model selector 5. Variation detector 6 monitors the output of the selector 5 for detecting a structural variation which may occur between successively detected most recent models. The output of the structural variation detector 6 is supplied to the output device 2. A warning signal is generated at the instant a structural variation is detected by the detector 6.

Figure 7:
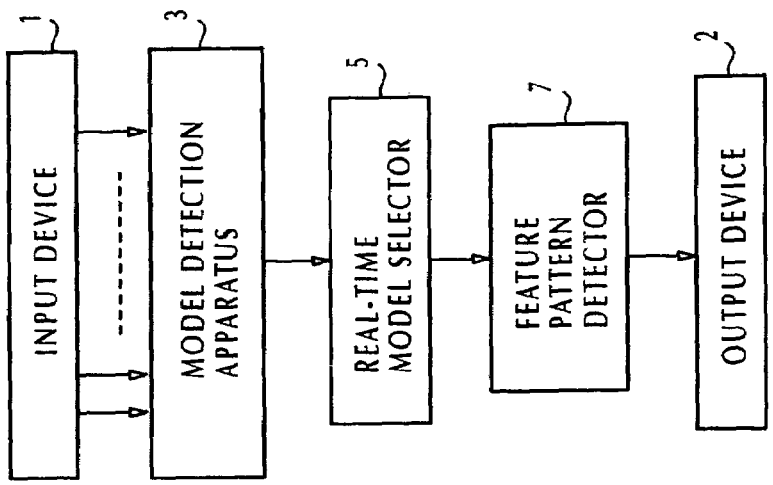
FIGS. 5, 6 and 7 are block diagrams of modified embodiments of the present invention.

The embodiment of FIG. 6 is modified as shown in FIG. 7 by the provision of a feature pattern detector 7, instead of the structural variation detector 6, for detecting a particular feature pattern in a series of real-time models detected by the real-time model selector 5. In this modification, a warning signal is generated at the instant the particular feature pattern is detected by the detector 7.

What is claimed is:

1. A computer implemented model detection apparatus for detecting model pattern changes representing intrusion of an anomalous source from a series of input data, the means for implementation being provided by computer, comprising:

means for storing mutually different distribution estimate parameters representing occurrences of said series of input data, each different distribution estimate parameter being stored in a different estimate parameter memory, the memory thereby being initialized;

means for producing a plurality of probability models by calculating probability occurrences of said series of data blocks using the stored distribution estimate parameters and a series of data blocks of said input data, said series of data blocks having an order and being successively supplied in said order to the respective successive means for producing distribution estimate parameters, and updating the stored distribution estimate parameters with the produced probability models respectively;

means for storing in a model series memory in said computing apparatus a plurality of candidate models corresponding in number to the stored distribution estimate parameters;

means for successively producing a plurality of optimal probability models from said series of data blocks of said input data, said distribution estimate parameters stored successively in said estimate parameter memories and said candidate models stored in said model series memory so that the optimal probability models minimize joint probability of occurrences of said data blocks and said distribution estimate parameters and updating the stored candidate models with the optimal probability models;

means for calculating, at each instant of time, an optimal model series from said plurality of candidate models stored in said model series memory; and means for warning in response to an occurrence of a rapid change in a number of command patterns from said optimal series of models exactly when command data of said anomalous source intrudes into said series of input data.

2. The model detection apparatus of claim 1, further comprising means for estimating transition probability of each of said candidate models stored in said model series memory and supplying a value indicating the estimated transition probability to said means for successively producing a plurality of said optimal probability models.

3. The model detection apparatus of claim 2, wherein said means for estimating transition probability is configured to perform a window-type transition probability estimation.

4. The model detection apparatus of claim 1, further comprising means for detecting a predetermined feature in said calculated optimal series of models.

5. The model detection apparatus of claim 1, further comprising:

means for selecting a most recently generated model on a real-time basis from said calculated optimal series of models; and means for successively receiving the selected most recently generated model from the means for selecting a most recently generated model and detecting a predetermined structural variation in a series of models successively received from said means for selecting a most recently generated model.

6. The model detection apparatus of claim 1, further comprising:

means for selecting a most recently generated model on a real-time basis from said calculated optimal series of models; and means for successively receiving the selected most recently generated model from the selecting means and detecting a predetermined feature pattern in a series of models successively received from said selecting means.

7. The model detection apparatus of claim 2, further comprising means for detecting a predetermined feature in said calculated optimal series of models.

8. The model detection apparatus of claim 2, further comprising:

means for selecting a most recently generated model on a real-time basis from said calculated optimal series of models; and means for successively receiving the selected most recently generated model from the selecting means and detecting a predetermined structural variation in a series of models successively received from said selecting means.

9. The model detection apparatus of claim 2, further comprising:
   means for selecting a most recently generated model on a real-time basis from said calculated optimal series of models; and
   means for successively receiving the selected most recently generated model from the selecting means and detecting a predetermined feature pattern in a series of models successively received from said selecting means.

10. A computer implemented model detection apparatus for detecting model pattern changes representing intrusion of an anomalous source from a series of input data, the means for implementation being provided by computer, comprising:
   means for storing mutually different distribution estimate parameters representing occurrences of said series of input data, each different distribution estimate parameter being stored in a different estimate parameter memory, the memory thereby being initialized;
   means for producing a plurality of probability models by calculating probability of occurrence of said series of data blocks using the stored distribution estimate parameters and a series of data blocks of said input data, said series of data blocks having an order and being successively supplied in said order to the respective successive means for producing distribution estimate parameters, and updating the stored distribution estimate parameters with the produced probability models respectively;
   means for calculating confidence values of data stored in respective estimate parameter memories;
   means for storing the calculated confidence values in respective confidence memories;
   means for storing in a transition probability memory in said computing apparatus a plurality of transition probability data;
   means for estimating transition probability from data stored in said confidence memories and data stored in said transition probability memory and updating the stored transition probability data with the estimated transition probability;
   means for calculating, at each instant of time, an optimal model series from said plurality of candidate model series stored in said transition probability memory; and
   means for warning in response to an occurrence of a rapid change in a number of command patterns from said optimal series of models exactly when command data of said anomalous source intrudes into said series of input data.

11. The model detection apparatus of claim 10, wherein said means for estimating transition probability is configured to perform a window-type transition probability estimation.

12. The model detection apparatus of claim 10, further comprising means for detecting a predetermined feature in said calculated optimal series of models.

13. The model detection apparatus of claim 10, further comprising:
   means for selecting a most recently generated model on a real-time basis from said calculated optimal series of models; and
   means for successively receiving the selected most recently generated model from the selecting means and detecting a predetermined structural variation in a series of models successively received from said selecting means.

14. The model detection apparatus of claim 10, further comprising:
   means for selecting a most recently generated model on a real-time basis from said calculated optimal series of models; and
   means for successively receiving the selected most recently generated model from the selecting means and detecting a predetermined feature pattern in a series of models successively received from said selecting means.

* * * * *